APPARATUS FOR SELECTIVELY MODIFYING PROGRAM INFORMATION

Filed July 30, 1954 3 Sheets-Sheet 1

INVENTOR.
ERNST S. SELMER
BY
Christie, Parker & Hale
ATTORNEYS

APPARATUS FOR SELECTIVELY MODIFYING PROGRAM INFORMATION

Filed July 30, 1954 3 Sheets-Sheet 2

INVENTOR.
ERNST S. SELMER
BY
Christie, Parker & Hale
ATTORNEYS

Dec. 8, 1959 E. S. SELMER 2,916,210

APPARATUS FOR SELECTIVELY MODIFYING PROGRAM INFORMATION

Filed July 30, 1954 3 Sheets-Sheet 3

INVENTOR.
ERNST S. SELMER

BY Christie, Parker & Hale

ATTORNEYS

United States Patent Office 2,916,210

Patented Dec. 8, 1959

2,916,210

APPARATUS FOR SELECTIVELY MODIFYING PROGRAM INFORMATION

Ernst S. Selmer, Oslo, Norway, assignor, by mesne assignments, to Burroughs Corporation, Detroit, Mich., a corporation of Michigan Application July 30, 1954, Serial No. 446,881

4 Claims. (Cl. 235—157)

This invention relates to methods and apparatus for altering command programs as they are introduced into a digital computer so that they can be routed to any arbitrary location in a storage medium in the computer, with all parts of the command program which refer to its own locations in the storage medium being correct.

In internally-programmed, automatic computers a storage medium is ordinarily employed as an internal memory for storing operands and commands which designate programs to be carried out automatically by the computer.

In one type digital computer, each command comprises an order portion and an address portion. The order portion of the command indicates the arithmetic operation which is to be performed, and the address portion of the command indicates the address in the storage medium of an operand upon which the arithmetic operation is to be performed. The address portion also indicates the addresses in the storage medium at which intermediate results and the answer are to be stored.

The storage medium is divided into addresses or cells which are numbered to distinguish them from one another, and the respective multi-digit commands and operands are stored in individual cells.

Major command programs are usually made up of a series of subprograms, and it saves time and expense if certain subprograms may be employed in different major programs. Since the command program for a major program ordinarily cannot be arranged so that one or more pre-arranged subprograms can be located in the storage cells in which the subprograms were originally employed, it is usually necessary to route the subprogram to a location in the storage medium which does not interfere with the major program.

The subprogram may be altered before it is introduced into the machine so as to route it to the desired location in the storage medium, but this requires hand labor and errors may be introduced during the alteration.

By way of example, the subprogram may be recorded on punched tape. In order to alter the subprogram, the tape may be altered in some cases by repunching it to modify the address portions of the commands. However, in most cases a new tape must be prepared so that the desired addresses may be recorded properly in the tape.

This difficulty is overcome in the present invention by adding predetermined numbers to the address portions of selected commands as they are introduced into the computer and before they are stored in the storage medium so that all parts of the subprogram which refer to addresses in the storage medium will be correct.

In a preferred embodiment of the invention, the commands are transferred from an input circuit through a storage register and an adder to the storage medium, and an auxiliary register is coupled to the adder for adding its contents to the address portion of selected commands as they are transferred through the adder to the storage medium. Each command is sensed while it is in the storage register for determining whether or not addition is to be effected, and one digit in the respective multi-digit commands is employed to indicate whether or not the contents of the auxiliary register are to be added to the respective commands.

The invention is explained with reference to the drawings, in which.

The invention is explained with reference to a digital computer of the binary-coded decimal type. However, the invention may be employed in various types of code-controlled apparatus in which command information is transferred from an input circuit to a storage medium before it is employed to control the operation of the apparatus.

In a typical binary-coded, decimal-type computer, the individual digits of a number having a plurality of digits are each coded in binary code notation ranging from 0 to 9. The binary notation is in the 1—2—4—8 system of counting. A column of bi-stable circuits may be employed to register each digit, and a band of four tracks along a storage medium such as a magnetic drum may be employed to store each digit. The 1—2—4—8 system of counting may be illustrated as follows:

*Table I*

| Decimal Number | Binary Code | | | |
|---|---|---|---|---|
| | 1 | 2 | 4 | 8 |
| | Bi-stable Circuit | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

where "1" indicates one condition of operation in a bi-stable circuit and "0" indicates another condition of operation.

If four bi-stable circuits are employed to register each digit and they are designated by the numbers 1, 2, 4 and 8, the digit which is registered is equal to the sum of the numbers represented by the bi-stable circuits which are actuated to the "1" condition.

Figure 1:
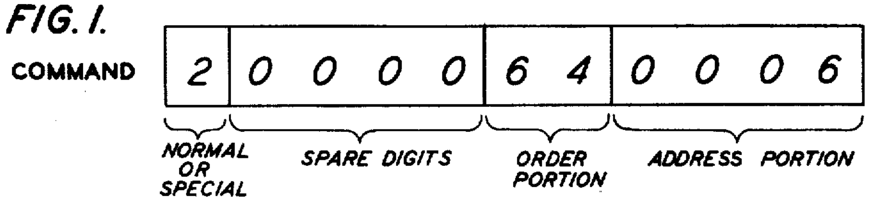
Fig. 1 illustrates a typical command.

Fig. 1 illustrates a typical command for use in a computer in which eleven digits may be stored in each cell in the internal memory. The first or sign digit indicates whether the command is normal or special, the next four digits are spares which are not important in the present disclosure, the next two digits designate an order which is to be carried out by the computer, and the last four digits designate the address in the internal memory of an operand upon which the order is to be executed or the address at which a result is to be stored.

If the first or sign digit of the command is a 0, 1, 4, 6, 8 or 9, the command is normal and it is stored in the internal memory without alteration.

If the first or sign digit of the command is a 2, 3, 5 or 7, the command is special and a number must be added to its address portion so that the command will refer to the correct address for the operand or for the storage of a result.

Figure 2:
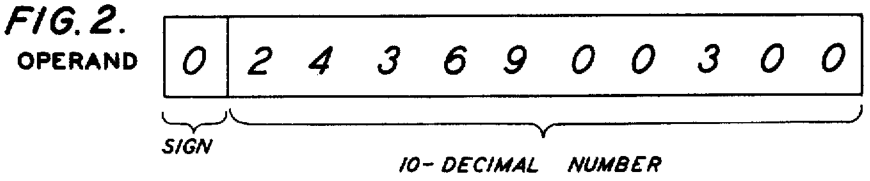
Fig. 2 illustrates a typical operand upon which the command is to be effected.

Fig. 2 illustrates a typical operand upon which commands may be carried out. The operand is a ten-decimal number and its sign. If the first or sign digit is 0 the sign is plus, and if this digit is 1 the sign is minus.

Figures 3, 4:
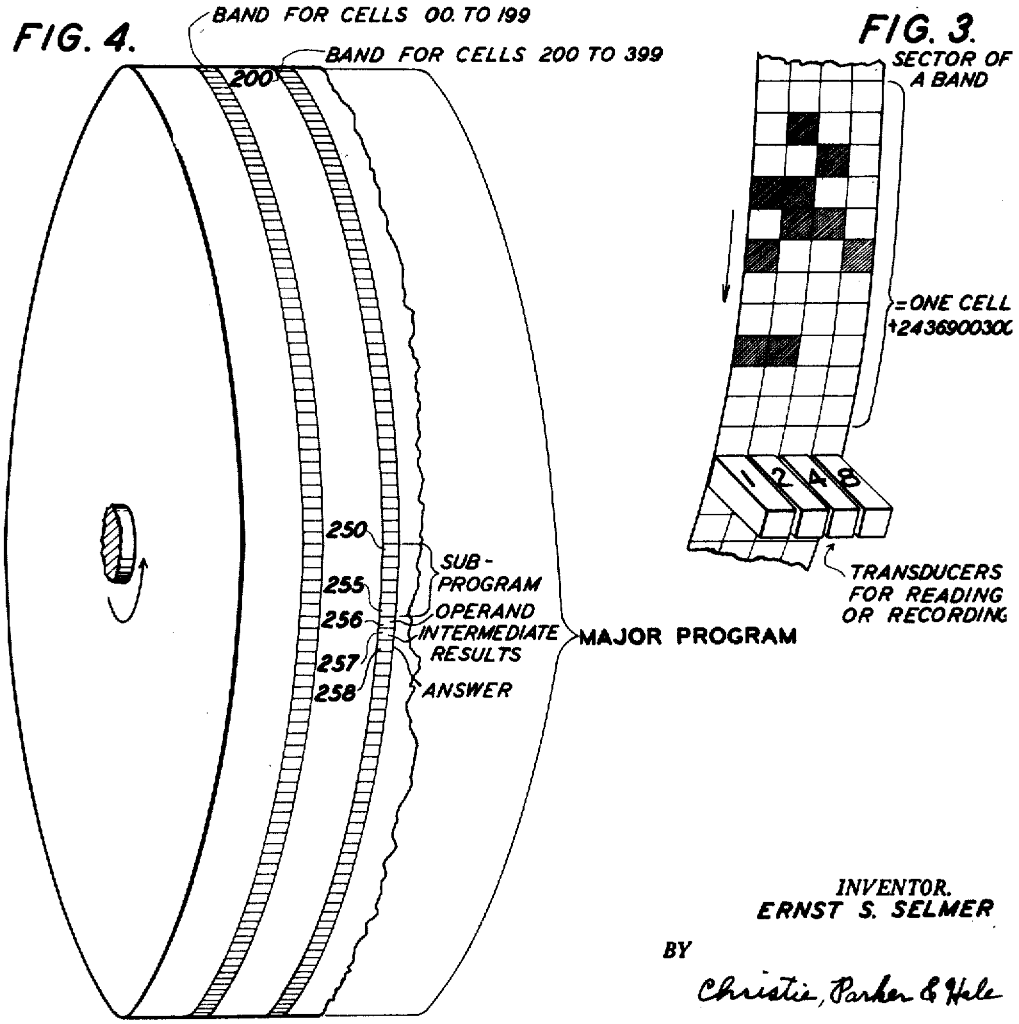
Fig. 3 illustrates how multi-digit numbers may be recorded in one cell in a storage medium.
Fig. 4 illustrates how a subprogram may be recorded in a series of cells on a storage medium.

It is common practice to employ a magnetic drum as the storage medium for high-speed computers. Fig. 3 illustrates how an eleven-digit number, such as the operand of Fig. 2, may be recorded in a cell on a magnetic drum in accordance with the designations in Table I.

Fig. 4 illustrates how a subprogram which requires nine storage cells on a magnetic drum may be positioned in a major program. Two bands are illustrated, with one band containing cells 0 to 199 and the other band containing cells 200 to 399. If all of the cells 0 to 399 are required for the major program and the subprogram is to be included, it is necessary to position the subprogram at a location in the major program which does not interfere with the major program. Fig. 4 shows that the subprogram is located in cells 250 to 258 in order to conform with the major program.

For the purpose of illustration, a relatively short subprogram is disclosed which causes the computer to cube the number +2436900300 and store the intermediate result (i.e., the square) as well as the answer at certain locations in the internal memory. Such a program may be presented to the input of the computer in the following form:

*Table II*

| | |
|---|---|
| 20000640006 | Command Program |
| 20000700006 | |
| 20000120007 | |
| 20000700006 | |
| 20000020008 | |

The five commands are designated special by the digit 2 in the most significant digit of the respective commands, and this indicates that a number must be added to the address portions of these commands.

When subprograms are compiled for use in more than one major program or for use in more than one part of a major program, it is desirable to designate the commands as special and to arrange the address portions so that a number must be added to them as the program is transferred to the internal memory. This requires the number 2, 3, 5 or 7 in the first or sign digit and it also requires that low numbers be employed in the address portions to indicate relative storage locations in the computer with reference to one another so that they can be altered by the addition of predetermined numbers to refer to absolute storage locations.

If the program of Table II is routed to cells 250 to 254 of the internal storage, 250 must be added to the address portions of the program so that all parts of the program which refer to addresses in the internal storage will be correct.

The following table shows the program so modified:

*Table III*

| Cell: | | |
|---|---|---|
| **250** | 00000640256 | Command Program |
| **251** | 00000700256 | |
| **252** | 00000120257 | |
| **253** | 00000700256 | |
| **254** | 00000020258 | |

The main program may cause a linking command and the operand to be stored as follows:

| Cell: | |
|---|---|
| **255** | 00000200280—Linking command |
| **256** | 02436900300—Operand |

The command in cell 250 orders that the operand in cell 256 be fetched to an accumulator register. The command in cell 251 orders that the operand in cell 256 be multiplied by the number in the accumulator register. The command in cell 252 orders that the intermediate result be stored in cell 257. The command in cell 253 orders that the operand in cell 256 be multiplied by the intermediate result. The command in cell 254 orders that the answer be stored in cell 258. The command in cell 255 orders that the next command be fetched from cell 280 so that the program is returned to the main program.

If the respective commands of Table II were merely transferred to cells 250 to 254 in the internal storage and later executed by the computer without alteration, the address portions of the command program would be incorrect because they would be effected upon an operand in cell 6 rather than in cell 256, the intermediate result would be stored in cell 7 rather than in cell 257, and the answer would be stored in cell 8 rather than in cell 258.

Hence, it is necessary to add the number 250 to the respective commands of the program so that all parts of the program which refer to addresses in the storage medium will be correct.

Figure 5:
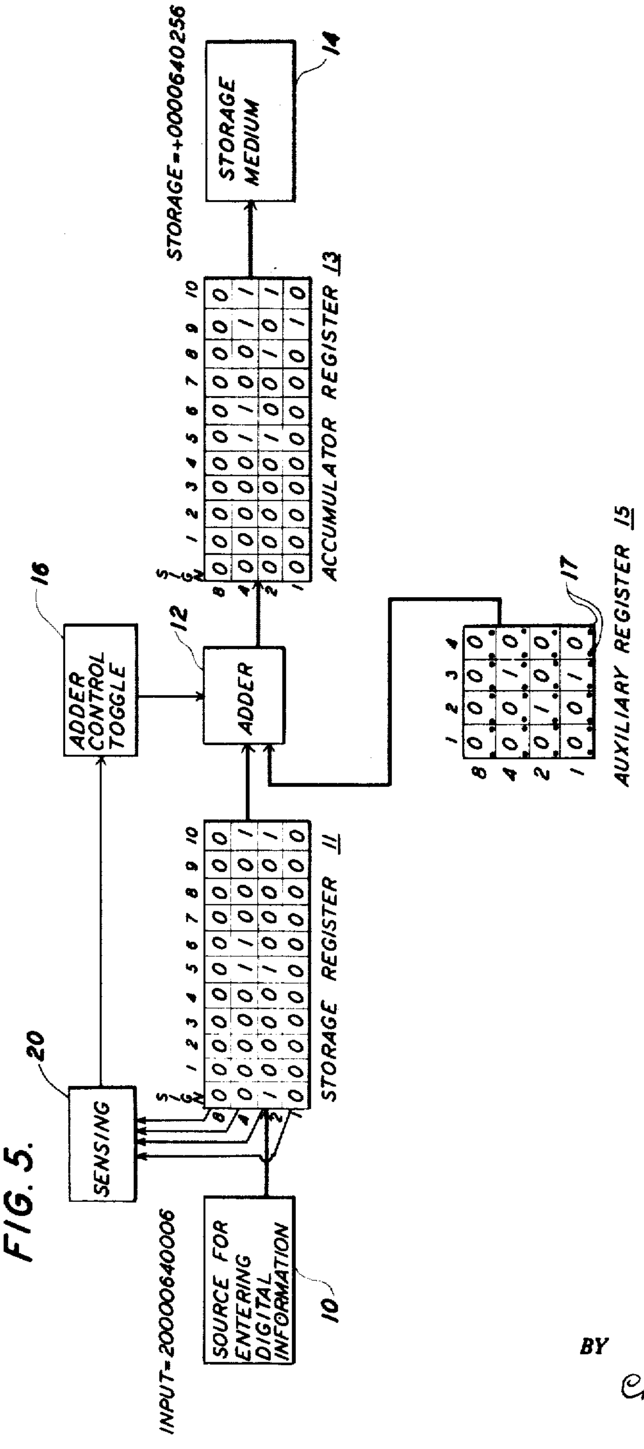
Fig. 5 illustrates an embodiment of the invention.

Fig. 5 illustrates an embodiment of the invention wherein such addition may be effected under the control of the first or sign digit of each command.

Figure 6:
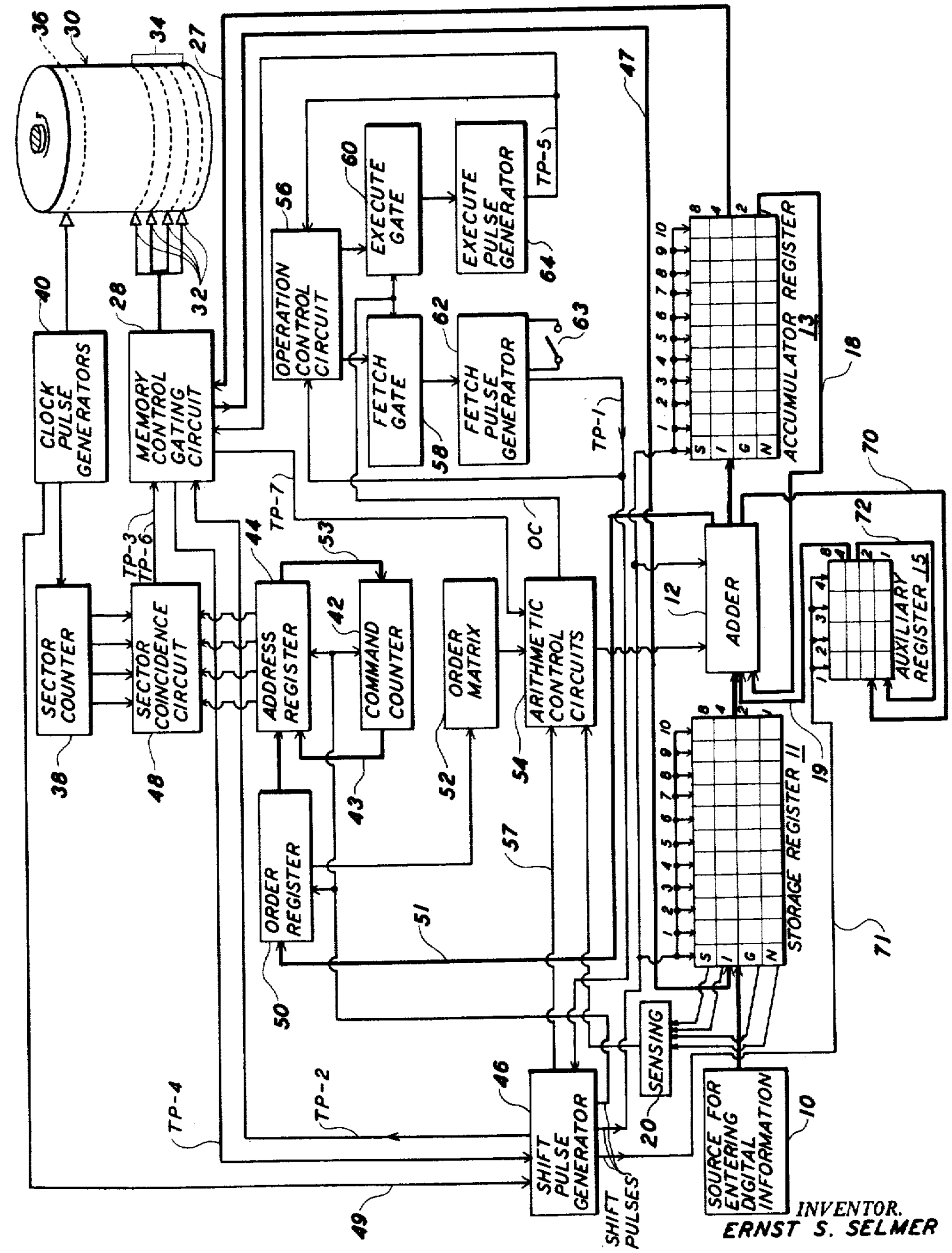
Fig. 6 shows how the apparatus of Fig. 5 may be employed in one type of digital computer.

The heavy lines of the drawings of Figs. 5 and 6 indicate transfer links which are capable of passing the binary code information with respect to each digit of a series of digits in time parallel along one or more of the links. That is, each of these information transfer links is capable of conveying all of the binary code information with respect to a single digit at one time.

Digital information which constitutes the program which is to be stored in the computer is transferred from a source 10 through a storage register 11, an adder 12, and an accumulator register 13 to a storage medium 14. An auxiliary register 15 is coupled to the adder, and an adder control toggle 16 is coupled to the sign column of the storage register 11 through a sensing circuit 20 for causing the adder to add the contents of the auxiliary register 15 to the last four digits of the number in the storage register 11 if the digit 2, 3, 5 or 7 in the 1—2—4—8 system of counting is registered in the sign column of the storage register.

By coupling a plurality of columns of four bi-stable circuits together so that the registration in a particular set of bi-stable circuits forming one column may be shifted into bi-stable circuits forming an adjacent column, a register may be formed in which the information may be registered by introducing a binary-coded digit into an end column and thereafter shifting that registration along the columns of the register until a number having a given number of digits is represented in a like number of columns in the register. The registers 11, 13 and 15 may be of this general type. Eleven columns of bi-stable circuits are employed in the storage and the accumulator registers, and four columns are employed in the auxiliary register. Since such registers are well known in the art they are not disclosed in detail here.

A pair of manually operable controls 17 are provided for setting the bi-stable circuits of the auxiliary register to the "0" or to the "1" state. If desired, a separate keyboard may be coupled to the auxiliary register for use in setting numbers in it.

The source for entering digital information may be any suitable arrangement for causing digital information to be entered in a storage register. For example, it may read information from punched or magnetic tape, or it may be a keyboard.

The adder may be any suitable type arranged to add digits one by one as they are presented to its input circuit. The adder control toggle 16 may be a bi-stable circuit. The sensing circuit 20 may be an electrical matrix which is coupled to the bi-stable circuits in the sign column of the storage register, with the matrix arranged to cause the adder control toggle 16 to be in one state if the digit 2, 3, 5 or 7 is registered in the sign column and to cause the adder control toggle 16 to be in the other state if the digit 0, 1, 4, 6, 8 or 9 is registered in the sign column.

Fig. 5 illustrates the operation of the registers when the first command of Table II is applied to the input. The auxiliary register is set to register the number 250. The command is first registered in the storage register 11, and then it is transferred through the adder to the accumulator register 13. As it is transferred through the adder, the contents of the auxiliary register 15 are added to it so that the number 250 is added to the address portion of the command. The modified command is then transferred to the storage medium 14. Thus, the first command has been altered by the addition of the number 250 to it, and the other four commands of Table II will be modified in the same manner, so that the entire command program will refer to the correct address for the operand, for the storage of the intermediate result, and for the answer, as shown in Table III.

It will be apparent that the method and apparatus of the present invention may be employed in various types of computers wherein the command program is transferred to a storage medium through circuits capable of performing addition to the information as it is conveyed to the storage medium. A detailed explanation of a suitable adder, along with a storage register, an accumulator register, and adder control circuitry may be found in my co-pending U.S. patent applications Serial No. 382,401, filed on September 25, 1953, entitled "Electronic Adder," and Serial No. 398,834, filed on December 17, 1953, now Patent No. 2,798,156, and entitled "Digit Pulse Counter."

Fig. 6 shows the apparatus of Fig. 5 incorporated in one type digital computer. Digital information is introduced to the computer from the source 10 which is coupled to the sign column of the storage register 11. The digits are entered one by one until the storage register is filled, and then they are transferred to the accumulator register 13 through the adder 12. The adder receives digits one by one from the tenth column of the storage register 11 and from either the tenth column of the accumulator register 13 over the link 18 or the fourth column of the auxiliary register 15 over the link 19, and it transfers the sum of these digits to the sign column of the accumulator register 13 from which they are shifted from left to right until the accumulator register is filled.

To transfer information from the storage register to the accumulator register without alteration, zeros may be added from the accumulator register to the information which is transferred from the storage register to the adder so that the digits which are transferred from the adder to the accumulator register are the same as those which were present in the storage register.

In order to alter information which is transferred from the storage register to the accumulator register, the digits which are registered in the auxiliary register may be added to the digits which are stored in columns 7 to 10 of the storage register as they are transferred through the adder to the accumulator register.

The digital information in the accumulator register 13 is transferred through the link 27 and a memory control gating circuit 28 to a magnetic drum 30. The digital information is recorded magnetically on the drum by a plurality of transducers 32 so that it is located in a plurality of tracks 34 around the magnetic drum. In order to simplify this disclosure only four transducers are illustrated. These transducers are sufficient for recording a single series of digits in binary code form in time parallel in the band of tracks 34 so as to record a series of digits in accordance with the code of Table I.

The information is recorded on the magnetic drum in specific cells with the number which is recorded in each of the cells having ten binary-coded decimal digits plus an indication of the sign of the number. The cells in which each group of ten digits may be recorded are identified by signals on a clock track 36 on the drum.

The individual addresses or cells on the magnetic drum are identified by a sector counter 38, which, in response to pulses derived from the clock track via a clock pulse generator 40, keeps step with the instantaneous position of the magnetic drum 30, thereby indicating the particular address or cell lying under the transducers 32.

The address of the first command to be executed is pre-set in a command counter 42, and it is transferred through the link 43 to an address register 44 under the influence of shift pulses from a shift pulse generator 46. As soon as the address which is registered in the sector counter 38 is identical to the address registered in the address register 44, a sector coincidence circuit 48 emits a signal indicating that the desired address is under the transducers 32. This output signal enables the memory control gating circuit 28 to pass the command which is recorded at that address on the magnetic drum through the link 47 to the storage register 11.

The operation of the shaft pulse generator 46 is synchronized with the movement of the magnetic drum by the clock pulses which are received over a lead 49.

Under the influence of pulses from the shift pulse generator 46, the command which is registered in the storage register 11 is shifted through the adder 12 and the link 51 into the address register 44 and an order register 50. Ordinarily, zeros are added to the command as it is shifted through the adder so that the command which is transferred to the address register 44 and the order register 50 for execution is the same as the command that was in the storage register 11.

The four digits which comprise the address portion of the command are registered in the address register, and the two digits which represent the order portion of the command are registered in the order register. The other four digits and the sign of the command are not employed in this operation.

Each time a new address is shifted into the address register 44, the old address is transferred over the link 53 to the command counter 42. The command counter is arranged to count up one for each address that is shifted into it. Hence the command counter may be employed to shift a sequence of addresses into the address register with the sequence progressing in numerical order. In the alternative, the command counter may be set manually.

When the operand address which is registered in the address register and the address which is registered in the sector counter are the same, the sector coincidence circuit 48 and the memory control gating circuit 28 cause the operand to be transferred over the link 47 to the storage register 11.

The particular type of computation to be made with respect to the operand is determined by the numerical registration in the order register 50. An order matrix 52 is coupled to the order register, and it serves to provide an output which distinguishes the respective orders.

Arithmetic control circuits 54 are coupled between the order matrix 52 and the adder 12. They cause the adder to perform the arithmetic computation which is designated by the order matrix. The adder causes digits to be added to or subtracted from the operand which is in the storage register, and the result of the computation is transferred to the accumulator register 13. The information in the accumulator register may be employed in subsequent computations or it may be read out by means of a suitable print-out arrangement. The adder control toggle 16 illustrated in Fig. 5 may be incorporated in the arithmetic control circuits 54 of Fig. 6.

After the operand has been transferred to the storage register and the arithmetic computations have been effected, the address of the next succeeding operand or command is shifted from the command counter into the address register. Then the above-described cycle of operations may be repeated under the control of the information which is registered in the order register and in the address register.

The fetch and execute cycles of operation of the computer include a number of separate and distinct operations. In the computer illustrated, these operations are performed in accordance with seven timing pulses as follows:

TP–1—Shift command address from command counter to address register.
TP–2—Set memory control gating circuits to read the command at the address indicated in the address register.
TP–3—Transfer the command from the magnetic memory drum to the storage register.
TP–4—Transfer the command from the storage register to the order and address registers.
TP–5—Set memory control gating circuits to read the operand which is at the address registered in the address register.
TP–6—Transfer this operand from the magnetic memory drum to the storage register.
TP–7—Perform the arithmetic computation in accordance with the order in the order register.

The TP–1 to TP–4 pulses comprise the fetch cycle of operation, and the TP–5 to TP–7 pulses comprise the execute cycle of operation.

In the computer illustrated, the cycles of operation are controlled by an operation control circuit 56 which is a bi-stable circuit arranged to open and close a fetch gate 58 and an execute gate 60 alternately in accordance with the condition of the bi-stable control circuit 56. These two gates are coupled to a fetch pulse generator 62 and an execute pulse generator 64 which serve to provide the TP–1 and TP–5 pulses. The fetch pulse generator 62 is provided with a switch 63 for actuating the generator to cause it to produce a TP–1 pulse.

With respect to the series of timing pulses which are employed to control the operation of the computer, the fetching operation is initiated by the fetch pulse generator 62 providing a fetch pulse TP–1. When the operation of the computer is first initiated, the initial pulse TP–1 may be generated by actuating the switch 63 of the fetch pulse generator 62. This fetch pulse is applied to the shift pulse generator 46 and to the operation control circuit 56. The pulse which is applied to the operation control circuit 56 changes its bi-stable condition so as to open the execute gate 60 and close the fetch gate 58.

The fetch pulse TP–1 causes the shift pulse generator 46 to shift an address from the command counter 42 into the address register 44. At the conclusion of this operation, a TP–2 pulse is generated by the shift pulse generator 46 and applied to the memory control gating circuit 28 to enable a command to be derived from the magnetic drum 30 when a sector coincidence pulse TP–3 is provided by the sector coincidence circuit 48. The sector coincidence pulse TP–3 causes the command to be read from the drum to the storage register 11.

At the completion of this operation a TP–4 pulse is generated by the memory control gating circuit 28, and this pulse causes the shift pulse generator 46 to shift the command from the storage register 11 to the order register 50 and the address register 44.

This completes the fetching operation, and at this time an operation complete pulse OC is provided by the arithmetic control circuits 54 in response to a signal over the lead 57 from the shift pulse generator 46. The operation complete pulse OC is applied to the fetch gate 58 and to the execute gate 60. Since the fetch gate is closed and the execute gate is open due to the potentials provided by the operation control circuit 56, the operation complete pulse OC is conveyed through the execute gate to cause the execute pulse generator 64 to generate an execute pulse TP–5. This pulse is applied to the memory control gating circuit 28 and also to the operation control circuit 56 so as to close the execute gate 60 and to open the fetch gate 58.

The execute pulse TP–5 causes the memory control gating circuit 28 to read an operand, since the address register 44 now contains the address of an operand which is to be transferred to the storage register 11. The sector coincidence circuit 48 emits a coincidence pulse TP–6 which actuates the memory control gating circuit 28 to read the desired operand from the magnetic drum over the link 47 into the storage register 11. As before, the binary-coded decimal digits of the operand, appearing digit after digit, are shifted into the storage register by shift pulses which are derived from the shift pulse generator 46.

At the completion of this operation, a TP–7 pulse from the memory control gating circuit 28 is applied to the arithmetic control circuits 54 for initiating the arithmetic computation which is designated by the order which is registered in the order register 50.

At the completion of the arithmetic computation an operation complete pulse OC is emitted by the arithmetic control circuits 54 to indicate the completion of the execution operation. This pulse is applied to the fetch gate 58 and the execute gate 60. Since the execute gate is closed and the fetch gate is open, the pulse is conveyed through the fetch gate to cause the fetch pulse generator 62 to generate the next fetch pulse TP–1 so as to initiate another fetching operation.

The cycle then repeats itself with the fetching of a command, the registration of that command in the order register 50 and the address register 44, and the execution of the command.

If the command program of Table II were employed as a sub-program located at addresses 250 to 254 in the computer of Fig. 6, the five commands would be transferred through the storage register 11, the adder 12, the accumulator register 13, the link 27, and the memory control gating circuit 28 to addresses 250 to 254 on the drum 30.

The five commands are designated special, and when they are sensed in the storage register the arithmetic control circuits cause the added to add the digits which are registered in the auxiliary register to the address portions of the respective commands as they are transferred to the storage drum.

The number 250 is registered in the auxiliary register. It may be registered by manually setting the bi-stable circuits to provide the desired registration, or the number 250 may be transferred from the source 10 through the storage register 11, the adder 12, and the link 70 to the auxiliary register.

Under the influence of shift pulses which are provided over the lead 71, the contents of the auxiliary register are circulated through the columns of bi-stable circuits and around the link 72 so as to cause the individual digits to be registered in the fourth column of the auxiliary register at the proper times for addition to the corresponding digits of the address portions of the commands.

In this manner, the command program of Table II is modified by the addition of 250 to the address portions of the special commands, so that the program of Table III is stored at addresses 250 to 254 on the storage drum.

The program is carried out by setting the address 250 in the command counter 42 and permitting the command counter to shift the other addresses into the address register in sequence as the individual commands are executed.

The command at address 250 causes the operand at address 256 to be fetched to the storage register and then transferred to the accumulator register by adding zeros to it. The command at address 251 causes the operand at address 256 to be fetched to the storage register and then be multiplied by the number in the accumulator register. The command at address 252 causes the intermediate result, 00593848307, to be stored at address 257. The command at address 253 causes the operand at address 256 to be fetched to the storage register and then multiplied by the intermediate result in the accumulator register. The command at address 254 causes the answer, 00144714912, to be stored at address 258. The linking command at address 255 orders that the command program be returned to the main program by causing the next command to be fetched from cell 280.

Thus, the subprogram was altered as it was transferred from the input to selected addresses in the storage medium in the computer so that all portions of the subprogram which refer to addresses in the storage medium were correct. Hence, the commands were executed upon the proper operand, and the intermediate result and the answer were stored at selected addresses at the end of the subprogram.

It will be apparent that the contents of the auxiliary register may be added to commands which are transferred directly from the source 10 to the address register 44 and the order register 50. In this case, the command is shifted from the source 10 through the storage register 11 and the adder 12 to the link 51 over which it is conveyed to the order and address registers. Addition of the contents of the auxiliary register is effected as the command is shifted through the adder.

I claim:

1. In a digital computer operating from an internally stored program comprising information to be operated on and commands specifying the operation including input means for recording a program to be introduced directly into the computer and to be executed by same, said program comprising groups of sub-programs having a group of commands, each command specifying an operation to be performed by the computer and an address corresponding to a storage location of information upon which the operation is to be performed, means for storing the inormation and the commands to be executed at preselected storage locations, register means coupled intermediate said storage means and said input means for receiving the program to be stored from said input means, means coupled to said register means for receiving and selectively modifying the address portions of preselected commands comprising a sub-program, means for sensing the commands in said register means to actuate said modifying means when preselected commands are registered therein, and means for transferring the commands including the modified commands of a sub-program to the storage means whereby the stored program may be directly executed by the computer.

2. In a digital computer operating from an internally stored program comprising information to be operated on and commands specifying the operation and an address corresponding to the storage location of information upon which the operation is to be performed, means for internally storing a program to be executed by the computer, an input device for reading a program to be stored by said internal storage means, storage means associated with said computer for receiving the program from said input device, means coupled to said storage means for receiving and selectively modifying the address portions of the commands of said program, means for sensing the commands in said storage means to actuate said modifying means when preselected commands are sensed therein, and means for receiving the program from said modifying means and transferring same to said internal storage means.

3. In a digital computer operating from an internally stored program comprising information to be operated on and commands specifying the operation, including input means for recording a program to be introduced directly into the computer and to be executed by same, said program comprising groups of sub-programs having a group of commands, each command specifying an operation to be performed by the computer and an address corresponding to a storage location of information upon which the operation is to be performed, means for storing the information and the commands to be executed at a preselected storage location, register means coupled intermediate said storage means and said input means for receiving the program to be stored from said input means, means coupled to said register means for selectively modifying the address portion of preselected commands comprising a sub-program, another register means coupled to said modifying means for storing modifying digits to be applied to said modifying means, means for sensing the program as it is received by said first mentioned register means for actuating said modifying means when preselected commands are sensed, and means for receiving the program from said modifying means and transferring same to said internal storage means.

4. In a digital computer operating from an internally stored program as defined in claim 3 wherein said modifying means comprises an adder.

References Cited in the file of this patent

UNITED STATES PATENTS

| | | |
|---|---|---|
| 2,540,654 | Cohen, et al. | Feb. 6, 1951 |
| 2,611,813 | Sharpless, et al. | Sept. 23, 1952 |
| 2,679,638 | Bensky, et al. | May 25, 1954 |
| 2,701,095 | Stibitz | Feb. 1, 1955 |
| 2,800,277 | Williams, et al. | July 23, 1957 |